(12) United States Patent
Bakulin et al.

(10) Patent No.: US 10,491,349 B2
(45) Date of Patent: Nov. 26, 2019

(54) METHODS AND DEVICES FOR MULTIPLE ACCESS TRANSMISSION

(71) Applicant: Huawei Technologies Canada Co., Ltd., Kanata (CA)

(72) Inventors: Mikhail Germanovich Bakulin, Moskovskaya obl. (RU); Gennady Vladimirovich Ovechkin, Ryazan (RU); Vitaly Borisovich Kreyndelin, Moscow (RU); Javad Abdoli, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 553 days.

(21) Appl. No.: 15/175,832

(22) Filed: Jun. 7, 2016

(65) Prior Publication Data

US 2017/0338922 A1  Nov. 23, 2017

Related U.S. Application Data

(63) Continuation of application No. PCT/IB2016/052868, filed on May 17, 2016.

(51) Int. Cl.
*H04B 1/69* (2011.01)
*H04L 5/00* (2006.01)
(Continued)

(52) U.S. Cl.
CPC ............ *H04L 5/0046* (2013.01); *H04B 1/69* (2013.01); *H04J 13/0003* (2013.01);
(Continued)

(58) Field of Classification Search
CPC ... H04L 5/0046; H04L 1/0071; H04L 5/0021; H04L 27/2626; H04L 27/34; H04B 1/69;
(Continued)

(56) References Cited

U.S. PATENT DOCUMENTS

| 2006/0013181 A1* | 1/2006 | Stolpman | H03M 13/03 370/342 |
| 2007/0211810 A1 | 9/2007 | Bohnke et al. | |

(Continued)

FOREIGN PATENT DOCUMENTS

| CN | 102957650 A | 3/2013 |
| JP | 2002198930 A | 7/2002 |
| JP | 5686818 B2 | 3/2015 |
| JP | 2016501470 A | 1/2016 |
| WO | 2016023495 A1 | 2/2016 |

*Primary Examiner* — Syed Haider
(74) *Attorney, Agent, or Firm* — Slater Matsil, LLP

(57) ABSTRACT

Aspects of the present disclosure provide methods and devices for multiple access downlink transmissions from a network side component to one or more User Equipment (UE) or multiple access uplink transmissions from two or more UEs to a network side component. In a downlink direction, a network side device generates, for each sub-carrier of the block of sub-carriers, a single constellation point from one or more bits of a multi-bit symbol, from each of multiple layers. In an uplink direction, each UE maps at least one bit from one or more layers of multi-bit symbols onto a subset of a block of sub-carriers. The two or more UEs collectively transmit on the block of sub-carriers.

24 Claims, 12 Drawing Sheets

(51) Int. Cl.
  *H04J 13/00*   (2011.01)
  *H04L 1/00*    (2006.01)
  *H04L 27/26*   (2006.01)
  *H04L 27/34*   (2006.01)
  *H04J 11/00*   (2006.01)

(52) U.S. Cl.
  CPC .......... *H04L 1/0071* (2013.01); *H04L 5/0021* (2013.01); *H04B 2001/6904* (2013.01); *H04J 2011/0006* (2013.01); *H04L 27/2626* (2013.01); *H04L 27/34* (2013.01)

(58) Field of Classification Search
  CPC .......... H04B 2001/6904; H04J 13/0003; H04J 2011/0006
  See application file for complete search history.

(56) References Cited

U.S. PATENT DOCUMENTS

| | | | |
|---|---|---|---|
| 2009/0022242 A1* | 1/2009 | Waters | H04L 1/0041 |
| | | | 375/299 |
| 2011/0158348 A1* | 6/2011 | Ponnampalam | H04L 27/2627 |
| | | | 375/298 |
| 2014/0140360 A1 | 5/2014 | Nikopour et al. | |
| 2014/0247782 A1 | 9/2014 | Arambepola et al. | |
| 2017/0272291 A1* | 9/2017 | Naim | H04L 27/2602 |
| 2018/0110031 A1* | 4/2018 | Yoshizawa | H04W 76/10 |

\* cited by examiner

METHODS AND DEVICES FOR MULTIPLE ACCESS TRANSMISSION

CROSS-REFERENCE TO RELATED APPLICATIONS

This application is a continuation of PCT Application No. PCT/IB2016/052868, filed on May 17, 2016, which application is hereby incorporated herein by reference.

TECHNICAL FIELD

This application relates to methods of transmission of signals, in particular simultaneous transmission of multiple streams of multi-bit symbols.

BACKGROUND

Sparse Code Multiple Access (SCMA) is a recently developed multiple user access scheme for telecommunication systems. In SCMA, multiple streams of data bits are encoded, each using a respective codebook made up of multiple codewords. Each codeword is transmitted on one or more sub-carriers of a block of SCMA sub-carriers.

When transmission occurs in a downlink direction from a network side component to one or more User Equipment (UEs), a superposition of the codewords on the block of sub-carriers is transmitted by the network side component. When transmission occurs in an uplink direction from two or more synchronized UEs to a network side component, each UE transmits one or more codewords on a subset of sub-carriers of the block of SCMA sub-carriers that are allocated to the UE. The network side component receives signals on the block of SCMA sub-carriers from the two or more UEs that are superposed on air interface channels between the two or more UEs and the network side component.

Performance of SCMA may be affected by various parameters, including codebook design.

SUMMARY

According to an embodiment of the disclosure, there is provided a method of signal transmission for a plurality of streams of multi-bit symbols. The method includes, for each of a plurality of sub-carriers, mapping p×M bits as a constellation point in a $2^{p \times M}$-point constellation and transmitting the constellation point on the sub-carrier. The p×M bits include M bits of a k-bit symbol from each of p streams of the plurality of streams. The variables p and M being positive integers.

Transmitting the constellation points on the plurality of sub-carriers are performed for the downlink direction.

In some embodiments, M bits equals k, so that all of the bits of the multi-bit symbol are mapped to more than one sub-carrier of the plurality of sub-carriers.

In some embodiments, M bits equals a number of bits in the multi-bit symbol (k) divided by a number of nonzero sub-carriers (q) allocated per stream (k/q) and each set of k/q bits of the multi-bit symbol is mapped to a different sub-carrier.

The method may further include, for each of the plurality of sub-carriers, assigning a bit significance to each subset of k/q bits of the k-bit symbol from the p streams.

The method may further include sorting the M bits from each of the p streams with respect to each other based on a set of assigned bit significances for each set of M bits.

According to an embodiment of the disclosure there is provided an apparatus including a processor and a computer-readable medium. The computer-readable medium has stored thereon computer executable instructions, that when executed by the processor, perform a method for transmitting a multi-bit symbol from each of a plurality of streams on a set of sub-carriers. The computer executable instructions are configured to perform a method that includes, for each of the plurality of sub-carriers, mapping p×M bits as a constellation point in a $2^{p \times M}$-point constellation and transmitting the constellation point on the sub-carrier. The p×M bits include M bits of a k-bit symbol from each of p streams of the plurality of streams. The variables p, M and k are positive integers.

According to an embodiment of the disclosure there is provided a method of signal transmission for at least one stream of multi-bit symbols. The method includes, for each of a plurality of sub-carriers, and for each of p streams of a total of K streams, mapping k/q bits as a constellation point in a $2^{k/q}$-point constellation and transmitting the constellation point on the sub-carrier. The k/q bits are a subset of a k-bit symbol and q is a number of non-zero sub-carriers of a total number of sub-carriers in a transmission resource allocated for the stream. Each subset of k/q bits is mapped to only one sub-carrier. The variables K, k, p and q being positive integers.

Transmitting the constellation points on the plurality of sub-carriers may be performed in either the uplink or downlink directions.

The method may further include, for each of the plurality of sub-carriers, assigning a bit significance to each subset of k/q bits of the k-bit symbol from the p streams.

The method may further include sorting the M bits from each of the p streams with respect to each other based on a set of assigned bit significances for each set of M bits.

According to an embodiment of the disclosure there is provided an apparatus including a processor and a computer-readable medium. The computer-readable medium has stored thereon computer executable instructions, that when executed by the processor, perform a method for transmitting a multi-bit symbol from each of at least one stream on a plurality of sub-carriers. The computer executable instructions are configured to perform a method that includes, for each of the plurality of sub-carriers and for each of p streams of a total of K streams, mapping k/q bits as a constellation point in a $2^{k/q}$-point constellation and transmitting the constellation point on the sub-carrier. The k/q bits are a subset of a k-bit symbol and q is a number of non-zero sub-carriers of a total number of sub-carriers in a transmission resource allocated for the stream. Each subset of k/q bits is mapped to only one sub-carrier. The variables K, k, p and q being positive integers.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF ILLUSTRATIVE EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Code Division Multiple Access (CDMA) is a multiple access technique in which data symbols are spread out over orthogonal code sequences, near-orthogonal code sequences, or a combination of both. Conventional CDMA encoding is a two-step process in which a binary code is mapped to a Quadrature Amplitude Modulation (QAM) symbol before a spreading sequence is applied. Although conventional CDMA encoding can provide relatively high data rates, new techniques and mechanisms for achieving even higher data rates are needed to meet the ever-growing demands of next-generation wireless networks. Low Density Spreading (LDS) is a form of CDMA used for multiplexing different layers of data. LDS uses repetitions of the same symbol on specific layers at nonzero locations in a time/frequency resource. As an example, in LDS-Orthogonal Frequency Division multiplexing (OFDM) a constellation point is repeated over nonzero frequency tones of an LDS block. In Sparse Code Multiple Access (SCMA), a multidimensional codebook is used to spread data over tones without necessarily repeating symbols. In SCMA, the multidimensional spreading codebooks are sparse, and hence detection can be made simpler.

Figure 1:
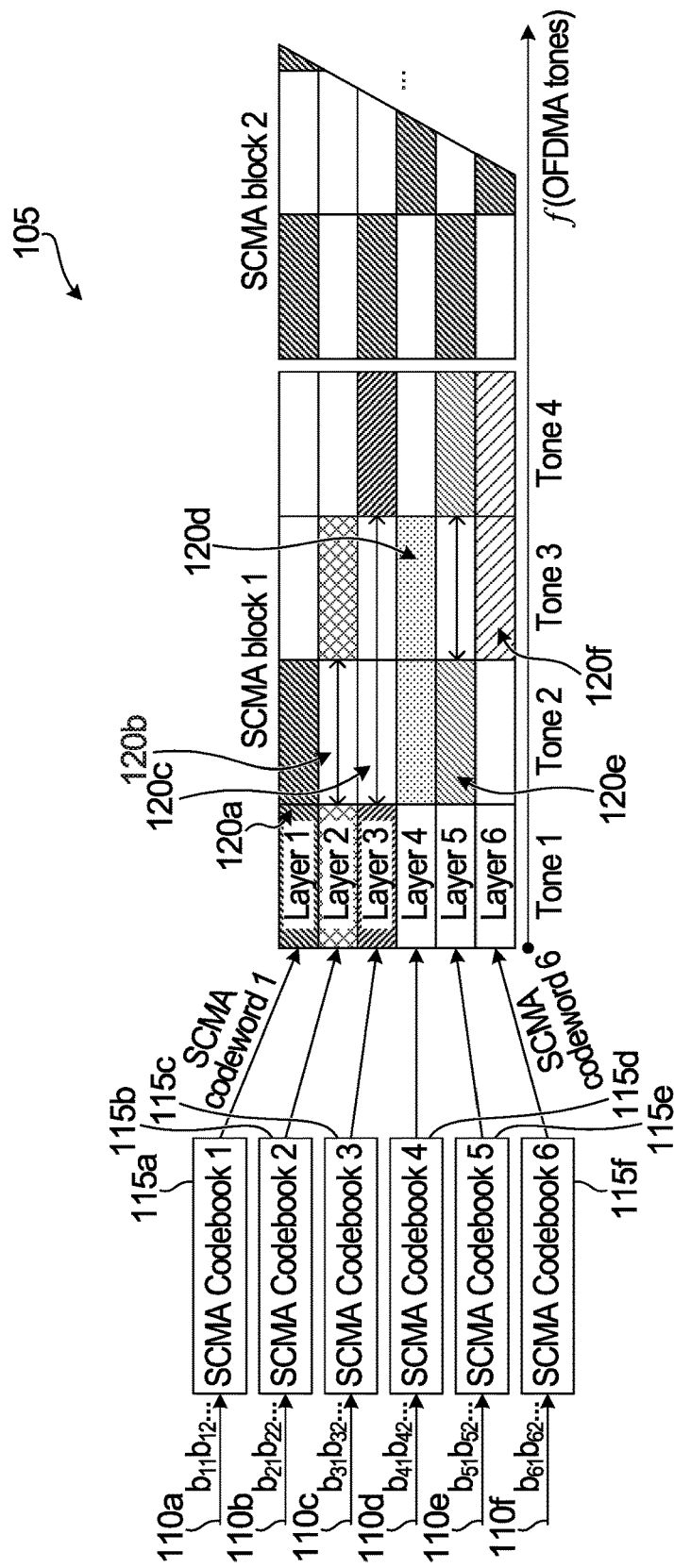
FIG. 1 is a block diagram of a multi-user Sparse Code Multiple Access (SCMA) multiplexing technique.

Referring to FIG. 1, an example of a multi-layer SCMA non-orthogonal multiplexing technique 105 will be described. Six streams of bits 110a, 110b, 110c, 110d, 110e and 110f are each shown being encoded by one of six SCMA codebooks 115a, 115b, 115c, 115d, 115e and 115f. Each SCMA codebook outputs a respective SCMA codeword 120a, 120b, 120c, 120d, 120e and 120f. The SCMA codewords are mapped to transmission resources called SCMA blocks for transmission over an air interface. The SCMA blocks are multiple layers over multiple transmission sub-carriers (Tone 1, Tone 2, Tone 3, Tone 4). As shown in FIG. 1, each SCMA codeword is spread over multiple transmission sub-carriers of a respective layer (Layer 1, Layer 2, Layer 3, Layer 4, Layer 5, Layer 6) of an SCMA block (SCMA Block 1 and a portion of SCMA block 2 are shown). A first SCMA codeword 120a is spread over Tones 1 and 2 of Layer 1 of the first SCMA block. A second SCMA codeword 120b is spread over Tones 1 and 3 of Layer 2 of the first SCMA block. A third SCMA codeword 120c is spread over Tones 1 and 4 of Layer 3 of the first SCMA block. A fourth SCMA codeword 120d is spread over Tones 2 and 3 of Layer 4 of the first SCMA block. A fifth SCMA codeword 120e is spread over Tones 2 and 4 of Layer 5 of the first SCMA block. A sixth SCMA codeword 120f is spread over Tones 3 and 4 of Layer 6 of the first SCMA block.

A representation, in matrix form, of the SCMA signal S encoded over the block of SCMA sub-carriers is as follows:

$$S = \begin{bmatrix} s_1^{(1)}(b^{(1)}) & s_1^{(2)}(b^{(2)}) & s_1^{(3)}(b^{(3)}) & 0 & 0 & 0 \\ s_2^{(1)}(b^{(1)}) & 0 & 0 & s_2^{(4)}(b^{(4)}) & s_2^{(5)}(b^{(5)}) & 0 \\ 0 & s_3^{(2)}(b^{(2)}) & 0 & s_3^{(4)}(b^{(4)}) & 0 & s_3^{(6)}(b^{(6)}) \\ 0 & 0 & s_4^{(3)}(b^{(3)}) & 0 & s_4^{(5)}(b^{(5)}) & s_4^{(6)}(b^{(6)}) \end{bmatrix}$$

The rows of the matrix represent signal components to be transmitted on respective sub-carriers of the SCMA block of sub-carriers, and the columns of the matrix represent signal components to be transmitted on individual streams, or layers. The individual matrix entries are represented as $s_i^j(b^{(j)})$, in which the matrix entry is a function of the bits being encoded. The index i is the sub-carrier on which the bits are being encoded, the index j is the layer from which the bits are being encoded, and the variable $b^{(j)}$ is a vector representation of the multiple bits being encoded by the SCMA codebook. An alternative representation of the signal mapped to each subcarrier of the SCMA block of sub-carriers is included below:

$$s_1 = s_1^{(1)}(b^{(1)}) + s_1^{(2)}(b^{(2)}) + s_1^{(3)}(b^{(3)})$$

$$s_2 = s_2^{(1)}(b^{(1)}) + s_2^{(4)}(b^{(4)}) + s_2^{(5)}(b^{(5)})$$

$$s_3 = s_3^{(2)}(b^{(2)}) + s_3^{(4)}(b^{(4)}) + s_3^{(6)}(b^{(6)})$$

$$s_4 = s_4^{(3)}(b^{(3)}) + s_4^{(5)}(b^{(5)}) + s_4^{(6)}(b^{(6)})$$

Some aspects presented in this disclosure can be implemented for downlink transmissions from a network side component to one or more User Equipment (UEs). Embodiments that are disclosed herein may be considered a generalization of SCMA in which a network side device generates, for each sub-carrier of the block of sub-carriers, a single constellation point from one or more bits of a multi-bit symbol, from each of multiple layers, for transmission to two or more UEs. Embodiments of the disclosure may be considered a generalization of SCMA in the sense that, on a given subcarrier, instead of a superposition of several codebook symbols, a symbol is transmitted that is generated using an alternative encoding and mapping arrangement to that of a conventional SCMA codebook.

Some aspects presented in this disclosure can be used for uplink transmissions from two or more UEs to a network side component. When aspects of the present disclosure are implemented in an uplink direction, each UE maps at least one bit from one or more layers onto a subset of a block of sub-carriers. The two or more UEs collectively transmit on the block of sub-carriers. Signal components from the UEs on respective sub-carriers are superposed over an air interface channel during transmission from the UEs to the network side device.

As shown in FIG. 1, SCMA uses layer specific codebooks to encode bits for transmission on multiple sub-carriers. Instead of using a codebook to generate a symbol that is mapped in one or more multi-point constellations on one or more sub-carriers, aspects of the present application provide for encoding one or more bits and mapping those encoded bits as a multi-point constellation on one or more sub-carriers.

Figure 2:
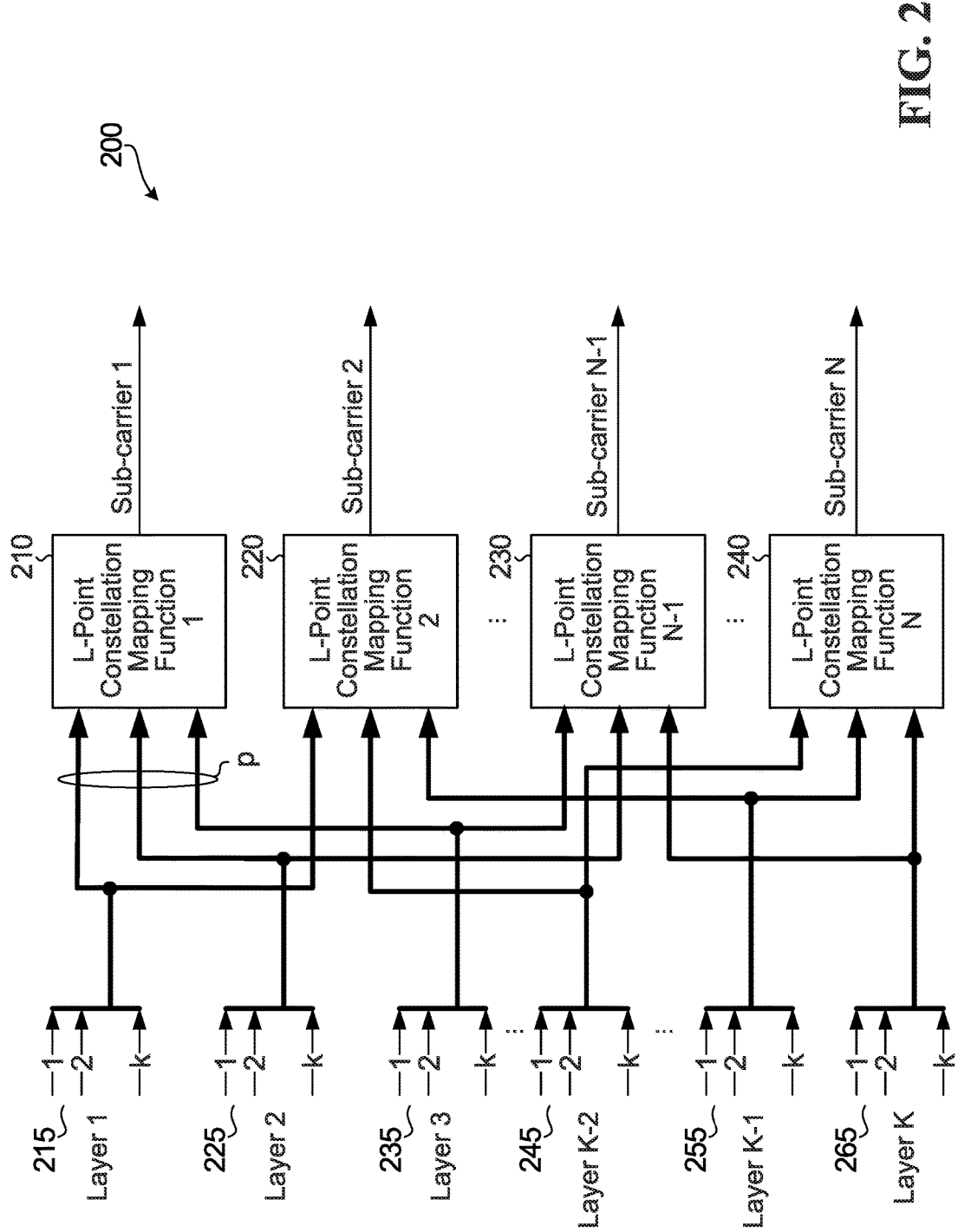
FIG. 2 is a block diagram of K layers of multi-bit symbols being encoded and mapped to N sub-carriers for downlink transmission according to an aspect of the disclosure.

A first embodiment of the disclosure will now be described with reference to FIG. 2. FIG. 2 illustrates encoding symbols of k bits from each of a subset of p layers of a total of K layers, and mapping the encoded bits to N sub-carriers using N L-point constellation mapping functions (210, 220, 230, 240). FIG. 2 may be considered an operation of a network side device transmitting to multiple client side UEs.

Each of the K layers (Layer 1, Layer 2, Layer 3, . . . , Layer K) is shown to provide a symbol including k bits (1, 2, . . . k). Each layer may provide a stream of such k-bit symbols when the network side device has data to transmit to respective UEs. In some implementations, a single layer is used for transmission to a single UE. In other implementations, multiple layers may be used for transmission to a single UE. All of the bits (1, 2, . . . , k) of the symbol 215 of Layer 1 are routed to both a first L-point constellation mapping function 210 and a second L-point constellation mapping function 220. All of the bits (1, 2, . . . , k) of the symbol 225 of Layer 2 are routed to both the first L-point constellation mapping function 210 and an N−1th L-point constellation mapping function 230. All of the bits (1, 2, . . . , k) of the symbol 235 of Layer 3 are routed to both the first L-point constellation mapping function 210 and the N−1th L-point constellation mapping function 230. All the bits of a symbol 245 of Layer K−2 are routed to both the second L-point constellation mapping function 220 and the Nth L-point constellation mapping function 240. All the bits of a symbol 255 of Layer K−1 are routed to both the second L-point constellation mapping function 220 and the Nth L-point constellation mapping function 240. All of the bits (1, 2, . . . , k) of the symbol 265 of Layer K are routed to the N−1th L-point constellation mapping function 230 and the Nth L-point constellation mapping function 240. In the above scenario of k binary bits from p layers being combined by the L-point constellation mapping function, the number L is equal to $2^{k*p}$.

Each L-point constellation mapping function 210, 220, 230, 240 receives p sets of bits, each set from a different layer. The combination of the p sets of bits forms a multi-bit symbol that is mapped to a point in an L-point constellation by the L-point constellation mapping function. The manner in which the p sets of bits are arranged in the multi-bit symbol is implementation specific. In some embodiments, the arrangement of the sets of bits within the multi-bit symbol is based on an assigned significance level of the respective sets of bits. The use of an assigned significance level for the sets of bits may aid in mitigating errors when decoding the bits at a receiver.

The arrangement of the sets of bits in the multi-bit symbol has an effect on the location of a point that is mapped by the L-point constellation mapping function. In a particular example in which two-bit symbols from each of three different layers are combined, the result is a six-bit symbol. If bits 1 and 2 (two bits from a first layer) of the six-bit symbol were considered to have the highest significance in the position of the point in the L-point mapping, bits 3 and 4 (two bits from a second layer) have less significance in the position of the point and bits 5 and 6 (two bits from a third layer) have the least significance in the position of the point, then bits 1 and 2 may have a higher protection against errors and bits 5 and 6 may have a lower protection against errors. Arranging the sets of bits of the multi-bit symbols so that a given layer's set of bits is not assigned a lowest significance in different sub-carriers may aid in providing a level of fairness of protection of the bits between the various layers against errors.

Figure 3:
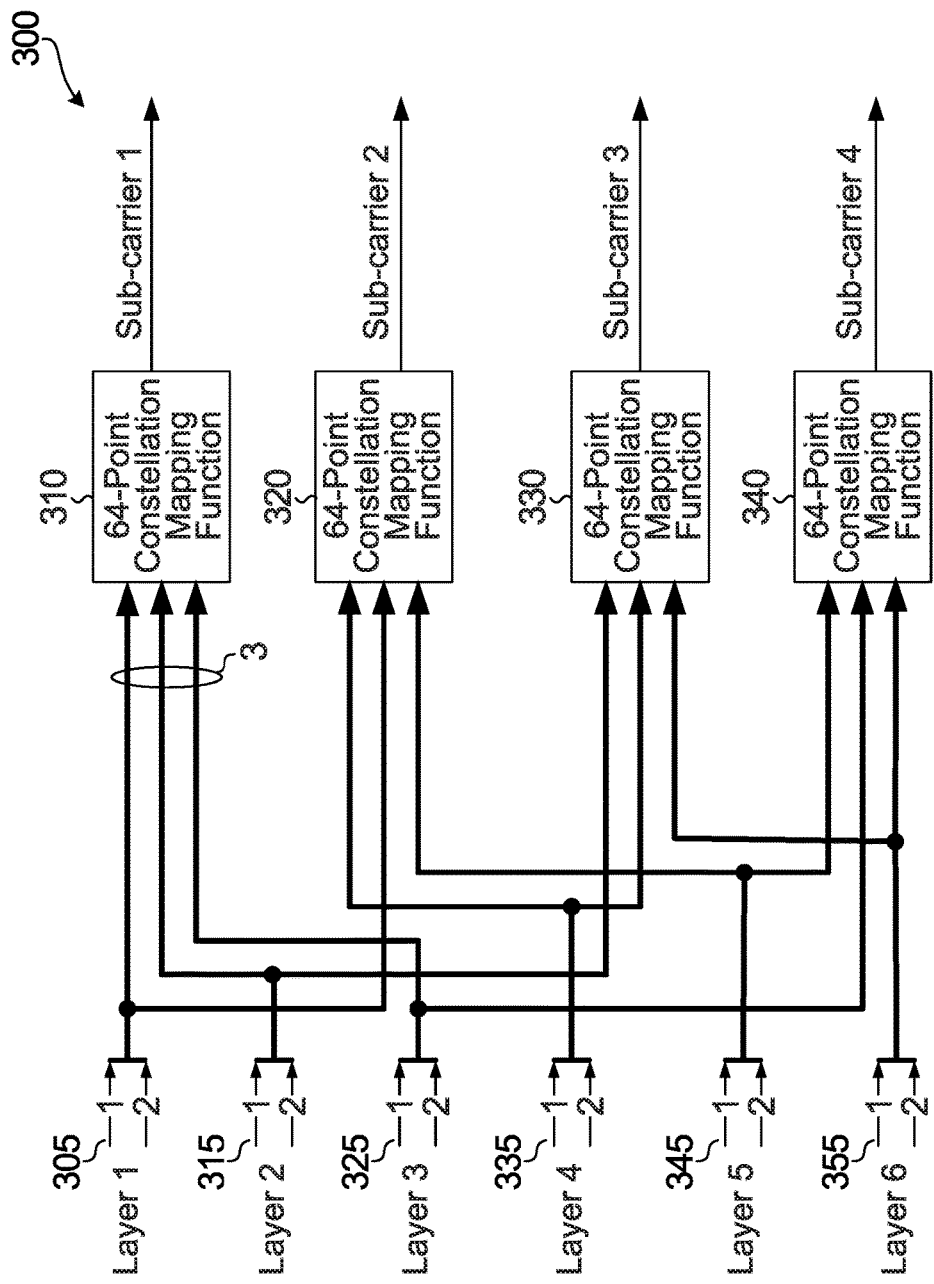
FIG. 3 is a block diagram of six layers of two-bit symbols being encoded and mapped to four sub-carriers for downlink transmission according to an aspect of the disclosure.

FIG. 3 is similar to FIG. 2, but FIG. 3 illustrates an example with specific values associated with the number of bits per symbol on a given layer, the total number of layer of bits, the number of layers of bits being combined by a respective multi-point constellation mapping function, the number of sub-carriers and the number of points in the constellation mapping. In FIG. 3, there are six layers (Layer 1, Layer 2, Layer 3, Layer 4, Layer 5, Layer 6) of two-bit symbols. Three layers of the two-bit symbols are combined at each of the multi-point constellation mapping functions (310, 320, 330, 340). The result of combining two bits from three layers is a six-bit symbol. As a result, the multi-point constellation mapping function maps the six-bit symbol as a point in a $2^6$=64-point constellation.

A representation of the six-bit symbols, as a function of the bits from three of the six streams, mapped to the four sub-carriers is as follows:

$$s_1 = s_1(b^{(1)}, b^{(2)}, b^{(3)})$$

$$s_2 = s_2(b^{(1)}, b^{(4)}, b^{(5)})$$

$$s_3 = s_3(b^{(2)}, b^{(4)}, b^{(6)})$$

$$s_4 = s_4(b^{(3)}, b^{(5)}, b^{(6)})$$

The variable $b^{(j)}$ is a vector representation of a set of bits of a jth layer (j=1 to 6).

Referring to FIG. 3, the pair of bits 305 of the symbol of Layer 1 is routed to both a first 64-point constellation mapping function 310 and a second 64-point constellation mapping function 320. The pair of bits 315 of the symbol of Layer 2 is routed to both the first 64-point constellation mapping function 310 and a third 64-point constellation mapping function 330. The pair of bits 325 of the symbol of Layer 3 is routed to both the first 64-point constellation mapping function 310 and a fourth 64-point constellation mapping function 340. The pair of bits 335 of the symbol of Layer 4 is routed to both the second 64-point constellation mapping function 320 and the third 64-point constellation mapping 330. The pair of bits 345 of the symbol of Layer 5 is routed to both the second 64-point constellation mapping function 320 and the fourth 64-point constellation mapping 340. The pair of bits 355 of the symbol of Layer 6 is routed to both the third 64-point constellation mapping function 330 and the fourth 64-point constellation mapping 340.

Each 64-point constellation mapping function 310, 320, 330, 340 receives the pairs of bits from each of three different layers. The combination of these three sets of bits form the six-bit symbol that is mapped to the 64-point constellation by the respective 64-point constellation mapping functions. As described above, the arrangement, or ordering, of the pairs of bits that are combined into the six-bit symbol for transmission on each sub-carrier may be based on bit significance to aid in fairness between the layers and to mitigate errors at the receiver.

The 64-point constellation mapping function may, for example, utilize Quadrature Amplitude Modulation (QAM) or Phase Shift Keying (PSK) as part of the mapping function.

In a second embodiment applicable to downlink, instead of combining multi-bit symbols from multiple layers on each of multiple sub-carriers, subsets of bits of the multi-bit symbol from each layer are mapped separately to different individual sub-carriers. An example will be shown below with reference to FIG. 4.

Figure 4:
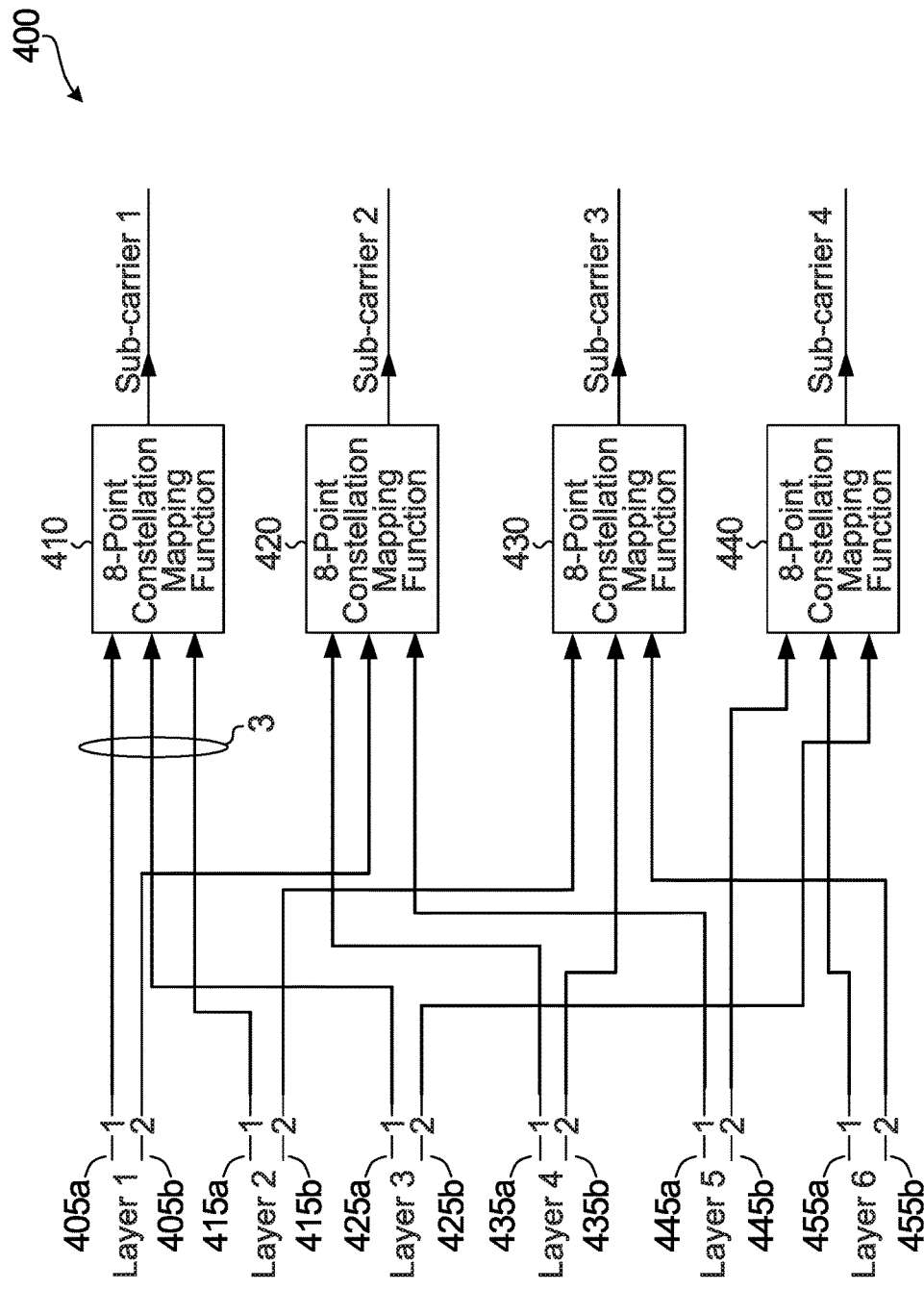
FIG. 4 is a block diagram of six layers of two-bit symbols being encoded and mapped to four sub-carriers for downlink transmission according to an alternative aspect of the disclosure.

FIG. 4 illustrates an example for six layers, each having a symbol of two bits. Instead of the pair of bits in the symbol being routed together to two multi-point constellation mapping functions, as in FIG. 3, each bit of the symbol of each layer is routed to different multi-point constellation mapping functions, such that a bit is mapped to only one sub-carrier. Each multi-point constellation mapping function receives a bit from three different layers. Because a single bit from each of three layers are combined by the multi-point constellation mapping function, the number of bits in the multi-bit symbol that is mapped to the multi-point constellation is 1 bit×3 layers=3 bits. As a result, the number of points in the multi-point constellation is 2³=8. Therefore, for each of the respective sub-carriers, the three-bit symbol is mapped to an 8-point constellation.

Referring to FIG. 4, a first bit 405a from Layer 1 is routed to a first 8-point constellation mapping function 410 and a second bit 405b from Layer 1 is routed to a second 8-point constellation mapping function 420. A first bit 415a from Layer 2 is routed to the first 8-point constellation mapping function 410 and a second bit 415b from Layer 2 is routed to a third 8-point constellation mapping function 430. A first bit 425a from Layer 3 is routed to the first 8-point constellation mapping function 410 and a second bit 425b from Layer 3 is routed to a fourth 8-point constellation mapping function 440. A first bit 435a from Layer 4 is routed to the second 8-point constellation mapping function 420 and a second bit 435b from Layer 4 is routed to the third 8-point constellation mapping function 430. A first bit 445a from Layer 5 is routed to the second 8-point constellation mapping function 420 and a second bit 445b from Layer 5 is routed to the fourth 8-point constellation mapping function 440. A first bit 455a from Layer 6 is routed to the fourth 8-point constellation mapping function 440 and a second bit 455b from Layer 6 is routed to the third 8-point constellation mapping function 430.

The arrangement of the individual bits that are combined into the 3-bit symbol for transmission on each sub-carrier may be based on an assigned significance of the individual bits to aid in fairness of recovery between the layers and to mitigate errors at the receiver.

A representation of the 3-bit symbols, as a function of the bits from three of the six streams, mapped to the four sub-carriers is as follows:

$$s_1 = s_1(b_1^{(1)}, b_1^{(2)}, b_1^{(3)})$$

$$s_2 = s_2(b_2^{(1)}, b_1^{(4)}, b_1^{(5)})$$

$$s_3 = s_3(b_2^{(2)}, b_2^{(4)}, b_2^{(6)})$$

$$s_4 = s_4(b_2^{(3)}, b_2^{(5)}, b_1^{(6)})$$

The variable $b_m^{(j)}$ is a representation of an mth bit (m=1 to M, where M=2) of a jth layer (j=1 to 6).

FIG. 4 illustrates an example for 6 layers each having 2-bit symbols. The bits from each layer are encoded with bits from two other layers, and then the three bits are mapped to one of the four sub-carriers. However, it should be understood that each of the values described above can be generalized. For example, the number of layers can be represented by K layers, the number of bits in the symbol of each layer can be represented by k bits, the number of layers that may be routed to a constellation mapping function can be p layers of the total of K layers, the number of bits in the subsets of bits from each layer that are routed to a particular constellation mapping function can be represented as k/q bits, where q is the number of non-zero valued sub-carriers on which the bits of a given layer are being transmitted and the constellation mapping function can have L points, where L=(k×p)/q. When k/q is not an integer value, the total number of bits in the symbol of a given layer can be divided into q groups of bits. Because some groups will contain more bits than other groups, the allocation of the q groups of bits can be varied for different sub-carriers in different resource blocks to maintain a level of fairness.

A third embodiment of the present disclosure is also directed to encoding subsets of bits of the multi-bit symbols from one or more layers and mapping those encoded subsets of bits separately to different individual sub-carriers. Examples for uplink will be shown below with reference to FIGS. 5A and 5B, and an example for downlink will be shown below with reference to FIG. 5C.

Figure 5A:
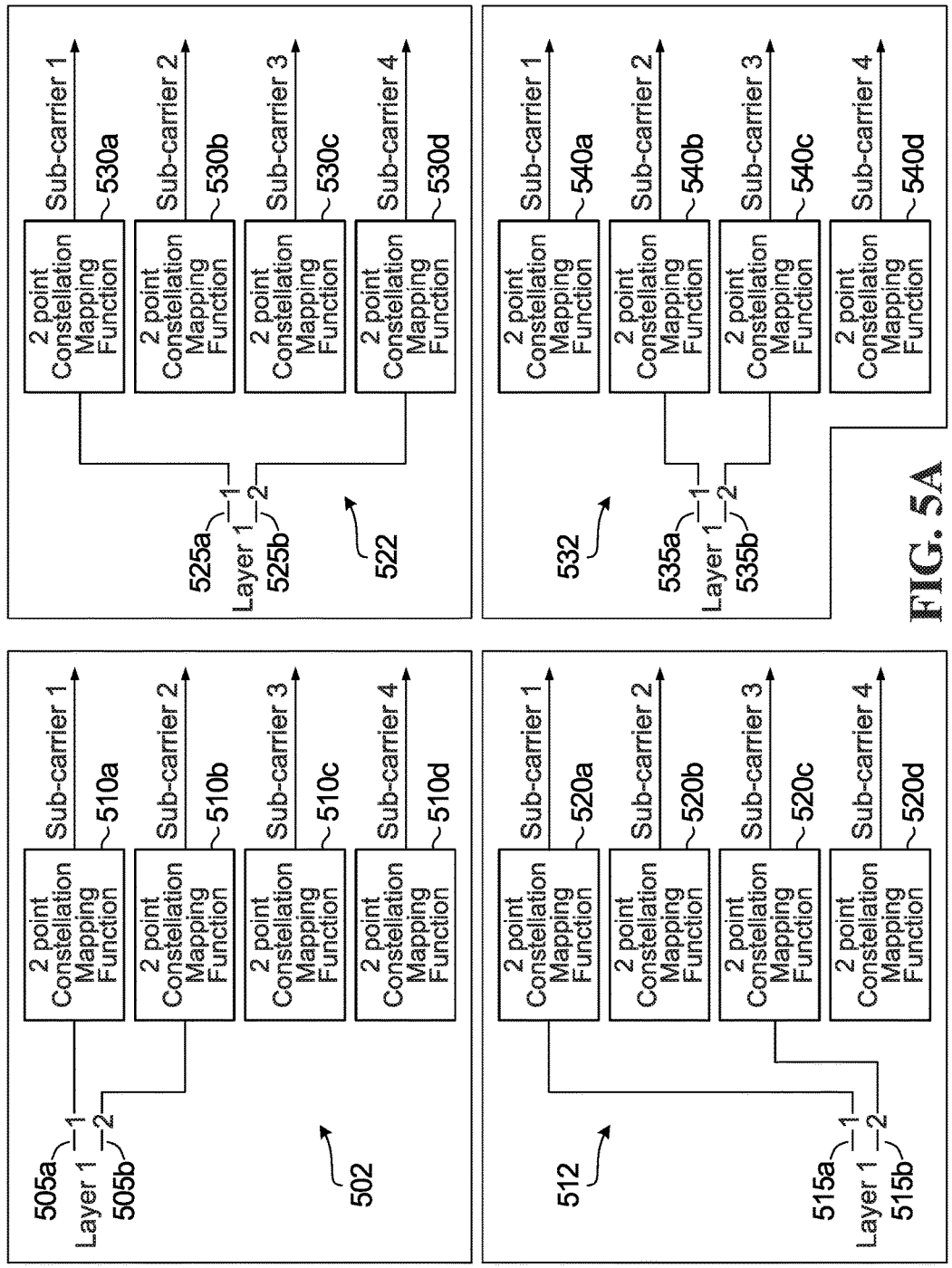
FIGS. 5A and 5B are block diagrams of six User Equipment (UE) each having a single layer of two-bit symbols being encoded and mapped to two sub-carriers of a set of four sub-carriers for uplink transmission according to an aspect of the disclosure.
Figure 5B:
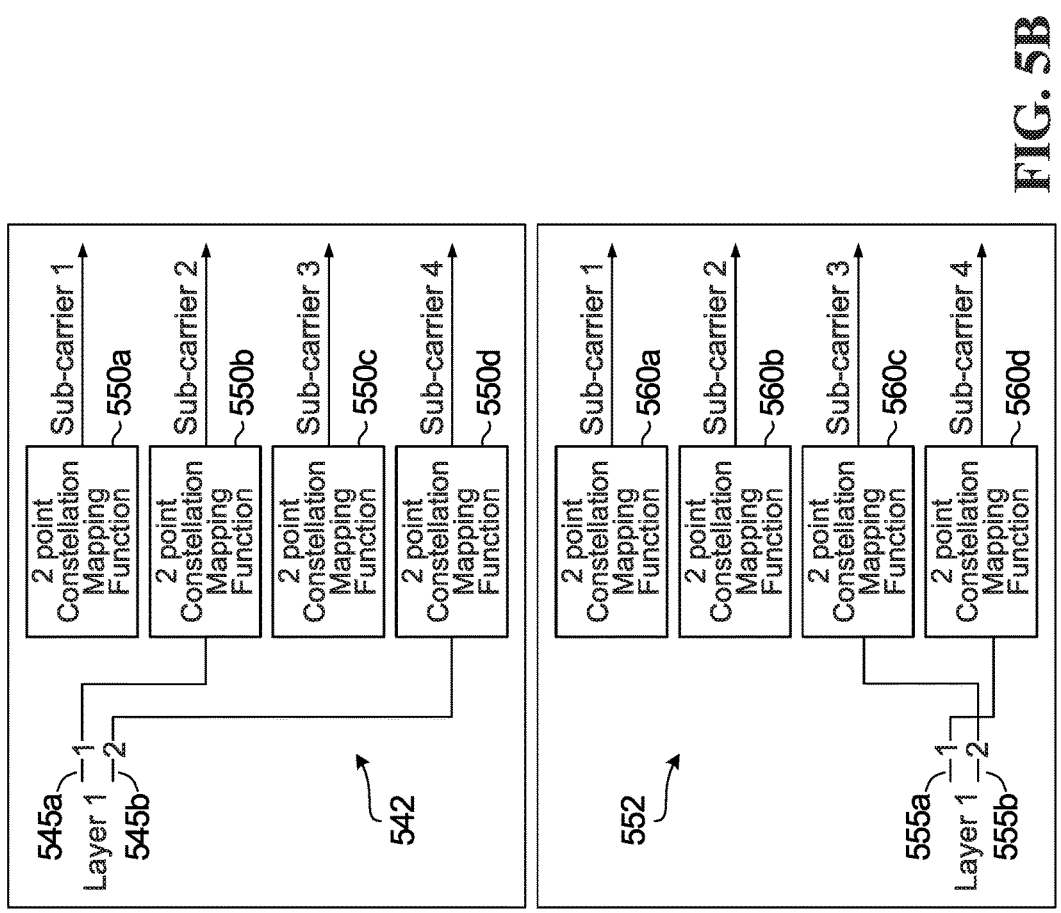

A first example pertaining to uplink will now be described with reference to FIGS. 5A and 5B. FIGS. 5A and 5B show an example in which six UEs 502, 512, 522, 532, 542 and 552 are each encoding a multi-bit symbol from a single layer onto an allocated subset of a set of sub-carriers in a transmission resource. In the particular example of FIGS. 5A and 5B, each UE is allocated two sub-carriers of a set of four sub-carriers. The signals that are transmitted on the respective sub-carriers by the six UEs superpose on the respective sub-carriers during transmission over an air interface channel between the UEs and a network side device.

It should be understood that if a UE is not allocated to transmit on a particular sub-carrier of the set of sub-carriers at a given time, no signal will be transmitted on that sub-carrier by that UE. A UE may be allocated a different subset of the set of sub-carriers at different times. It should also be understood that although the example of FIGS. 5A and 5B includes six UEs, the number of UEs could be larger or smaller than six based on a given implementation of the processes described herein.

In a particular UE of FIGS. 5A and 5B, each data bit of a two-bit symbol is routed to only a single multi-point constellation mapping function for mapping to only one sub-carrier. In the particular example of FIGS. 5A and 5B, because only the single bit from the single layer is routed to a multi-point constellation mapping function, the number of bits that is mapped by the multi-point constellation mapping function is 1 bit×1 layer=1 bit. As a result, the number of points in the multi-point constellation is 2¹=2. Therefore, for each of the respective sub-carriers, the single bit is mapped to the 2-point constellation.

Referring again to FIGS. 5A and 5B, the first UE 502 is transmitting a stream of two-bit symbols to a network side device (not shown). A first bit 505a from the two-bit symbol is routed to a first 2-point constellation mapping function 510a and a second bit 505b from the two-bit symbol is routed to a second 2-point constellation mapping function 510b.

In the second UE 512, a first bit 515a from the two-bit symbol is routed to the first 2-point constellation mapping function 520a and a second bit 515b from the two-bit symbol is routed to a third 2-point constellation mapping function 520c.

In the third UE 522, a first bit 525a from the two-bit symbol is routed to a first 2-point constellation mapping function 530a and a second bit 525b from the two-bit symbol is routed to a fourth 2-point constellation mapping function 530d.

In the fourth UE 532, a first bit 535a from the two-bit symbol is routed to a second 2-point constellation mapping function 540b and a second bit 535b from the two-bit symbol is routed to a third 2-point constellation mapping function 540c.

In the fifth UE 542, a first bit 545a from the two-bit symbol is routed to the second 2-point constellation mapping function 510b and a second bit 545b from the two-bit symbol is routed to the fourth 2-point constellation mapping function 550d.

In the sixth UE 552, a first bit 555a from the two-bit symbol is routed to the fourth second 2-point constellation mapping function 560d and a second bit 555b from the two-bit symbol is routed to the third 2-point constellation mapping function 560c.

A representation, in matrix form, of the collective signals transmitted from the six UEs of FIGS. 5A and 5B, is as follows:

$$S = \begin{bmatrix} s_1^{(1)}(b_1^{(1)}) & s_1^{(2)}(b_1^{(2)}) & s_1^{(3)}(b_1^{(3)}) & 0 & 0 & 0 \\ s_2^{(1)}(b_2^{(1)}) & 0 & 0 & s_2^{(4)}(b_1^{(4)}) & s_2^{(5)}(b_1^{(5)}) & 0 \\ 0 & s_3^{(2)}(b_2^{(2)}) & 0 & s_3^{(4)}(b_2^{(4)}) & 0 & s_3^{(6)}(b_2^{(6)}) \\ 0 & 0 & s_4^{(3)}(b_2^{(3)}) & 0 & s_4^{(5)}(b_2^{(5)}) & s_4^{(6)}(b_1^{(6)}) \end{bmatrix}$$

The rows of the matrix represent signal components to be transmitted on respective sub-carriers, and the columns of the matrix represent signal components to be transmitted on the respective layers. In particular, in this case the columns correspond to the individual UEs because each UE has only a single stream. The combined matrix entries in the six columns of the matrix represent the values from the six UEs that are transmitted on each of the sub-carriers. The individual matrix entries are represented as $s_i^j(b^{(j)})$, in which the matrix entry is a function of the bits being encoded, where i is the sub-carrier on which the bits are being encoded, j is the layer (UE) from which the bits are being encoded and $b_m^{(j)}$ (m=1 or 2) is the individual bit being encoded. An alternative representation of the signal mapped to each subcarrier is included below:

$$s_1 = s_1^{(1)}(b^{(1)}) + s_1^{(2)}(b^{(2)}) + s_1^{(3)}(b^{(3)})$$

$$s_2 = s_2^{(1)}(b^{(1)}) + s_2^{(4)}(b^{(4)}) + s_2^{(5)}(b^{(5)})$$

$$s_3 = s_3^{(2)}(b^{(2)}) + s_3^{(4)}(b^{(4)}) + s_3^{(6)}(b^{(6)})$$

$$s_4 = s_4^{(3)}(b^{(3)}) + s_4^{(5)}(b^{(5)}) + s_4^{(6)}(b^{(6)})$$

Because each UE transmits only a selected subset of the sub-carriers, the above matrix and individual sub-carrier equations are a collective representation of what is being transmitted by all of the UEs, as opposed to any one UE individually.

A UE may have the processing power to implement multiple multi-point constellation mapping functions to enable processing of signals to be mapped to each of the sub-carriers allocated to the UE. Although FIGS. 5A and 5B show multiple 2-point constellation mapping functions each dedicated for a specific sub-carrier, FIGS. 5A and 5B are an example used for describing an embodiment of the application to clearly show particular sub-carriers on which a UE does and does not transmit. In other implementations, there may be multiple multi-point constellation mapping functions, which are not dedicated to particular sub-carriers, and as such can be used to map the one or more layers to be transmitted by the UE to any allocated sub-carriers.

FIGS. 5A and 5B illustrate an example of six UEs, each having a single layer each having 2-bit symbols. Each bit of each 2-bit layer is encoded separately, and is mapped to only one respective sub-carrier. However, it should be understood that each of the values described above can be generalized. For example, the number of layers can be represented by K layers, the number of bits in the symbol of each layer can be represented by k bits, the number of layers that may be routed to a constellation mapping function can be p layers of the total of K layers, the number of bits in the subsets of bits from each layer that are routed to a particular constellation mapping function can be represented as k/q bits, where q is the number of non-zero valued sub-carriers on which the bits of a given layer are being transmitted and the constellation mapping function can have L points, where L=(k×p)/q. When k/q is not an integer value, the total number of bits in the symbol of a given layer can be divided into q groups of bits. Because some groups will contain more bits than other groups, the allocation of the q groups of bits can be made to different sub-carriers in different resource blocks to maintain a level of fairness.

Furthermore, although FIGS. 5A and 5B illustrate each UE transmitting only a single layer, it should be understood that this should not be taken as a limitation. One or more UEs of a group of UEs that are transmitting together to a network side device may have more than one layer of multi-bit symbols to transmit.

In the scenario in which a UE is transmitting multiple layers, multi-point constellation mapping functions that are mapping to the sub-carriers allocated to the UE will receive a subset of bits of the k-bit symbol from each of the layers the UE is transmitting. For example, if a UE is transmitting two layers, each multi-point constellation mapping function mapping to a sub-carrier that is allocated for use by the UE will receive a different subset of k/q bits from each of the two layers, where q is the number of non-zero valued sub-carriers on which the bits of a given layer are being transmitted. It should be considered that to properly decode the bits at a receiver there needs to be a manner of distinguishing the bits for a given layer. Therefore, bits from different layers that are encoded to a same sub-carrier may need to be encoded with a different encoding scheme or possibly a different power level to differentiate the signal components.

Figure 5C:
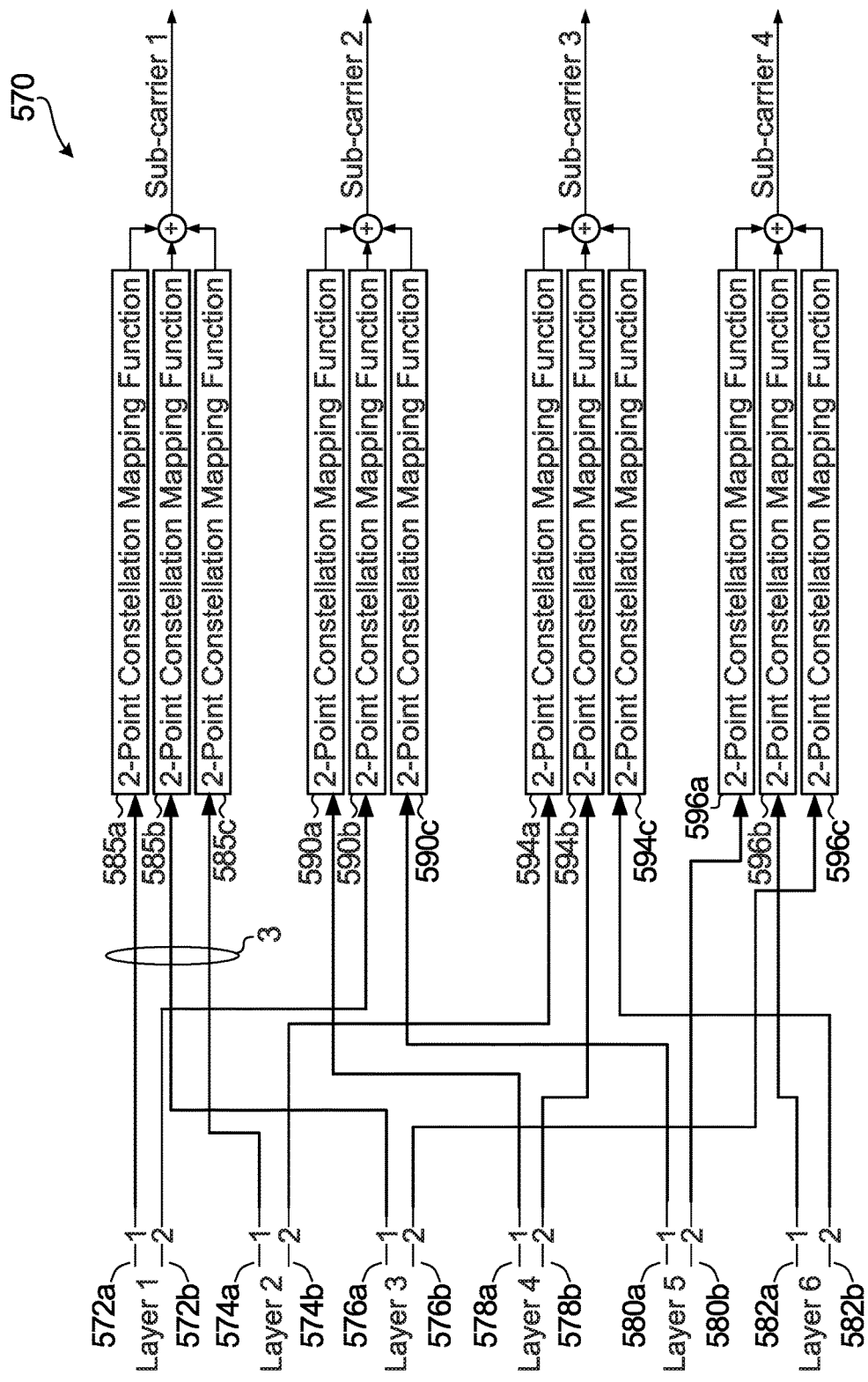
FIG. 5C is a block diagram of six layers of two-bit symbols being encoded and mapped to four sub-carriers for downlink transmission according to an alternative aspect of the disclosure.

Another example pertaining to downlink will now be described with reference to FIG. 5C. FIG. 5C shows an example in which a network side device 570 encodes a multi-bit symbol from each of multiple layers onto set of sub-carriers. FIG. 5C is similar to FIG. 4 in that there are six layers and each layer has a 2-bit symbol and that the 2 bits of each layer are separately mapped to different sub-carriers of the set of sub-carriers. However, in FIG. 4, for a single sub-carrier the individual bits from each of three layers are combined and encoded as a three-bit symbol by an 8-point constellation mapping function, whereas in FIG. 5C, for a single sub-carrier, each of the three bits, from the three different layers, are each respectively encoded by a 2-point constellation mapping function. The results of those three encoded bits are mapped to the sub-carrier.

A first bit 572a from Layer 1 is routed to a first 2-point constellation mapping function 585a and a second bit 575b from Layer 1 is routed to a fifth 2-point constellation mapping function 590b. A first bit 574a from Layer 2 is routed to a third 2-point constellation mapping function 585c and a second bit 574b from Layer 2 is routed to a seventh 2-point constellation mapping function 594a. A first bit 576a from Layer 3 is routed to a second 2-point constellation mapping function 585b and a second bit 576b from Layer 3 is routed to a twelfth 2-point constellation mapping function 596c. A first bit 578a from Layer 4 is routed to a fourth 2-point constellation mapping function 590a and a second bit 578b from Layer 4 is routed to an eighth 2-point constellation mapping function 594b. A first bit 580a from Layer 5 is routed to a sixth 2-point constellation mapping function 590c and a second bit 580b from Layer 5 is routed to a tenth 2-point constellation mapping function 596a. A first bit 582a from Layer 6 is routed to an eleventh 2-point constellation mapping function 596b and a second bit 582b from Layer 6 is routed to the ninth 2-point constellation mapping function 594c.

The outputs from 2-point constellation mapping functions 585a, 585b and 585c are all mapped to Sub-carrier 1 and thus superposed before transmission by the network side device. The outputs from 2-point constellation mapping functions 590a, 590b and 590c are all mapped to Sub-carrier 2 and thus superposed before transmission by the network side device. The outputs from 2-point constellation mapping functions 594a, 594b and 594c are all mapped to Sub-carrier 3 and thus superposed before transmission by the network side device. The outputs from 2-point constellation mapping functions 596a, 596b and 596c are all mapped to Sub-carrier 4 and thus superposed before transmission by the network side device.

FIG. 5C illustrates an example for 6 layers each having 2-bit symbols. The two bits of each layer are encoded separately and then are mapped to two of the four available sub-carriers in the transmission resource. However, it should be understood that each of the values described above can be generalized. For example, the number of layers can be represented by K layers, the number of bits in the symbol of each layer can be represented by k bits, the number of layers that may be routed to a constellation mapping function can be p layers of the total of K layers, the number of bits in the subsets of bits from each layer that are routed to a particular constellation mapping function can be represented as k/q bits, where q is the number of non-zero valued sub-carriers on which the bits of a given layer are being transmitted and the constellation mapping function can have L points where L=(k×p)/q. When k/q is not an integer value, the total number of bits in the symbol of a given layer can be divided into q groups of bits. Because some groups will contain more bits than other groups, the allocation of the q groups of bits can be made to different sub-carriers in different resource blocks to maintain a level of fairness.

Performance Evaluation

For the purpose of illustrating the performance of several embodiments of the application for a particular set of parameters, an example simulation will be described with reference to FIGS. 6A and 6B.

The simulation was run for four different multiple access techniques. The first technique is a conventional SCMA technique using a particular code book design. The simulation conditions for the first technique were applied for the downlink direction and consisted of a signal configuration of six layers having two bits per symbol per layer, which are mapped to a set of four sub-carriers. The second technique is a first embodiment of the application of the type described with reference to FIGS. 2 and 3, in which all the bits of a 2-bit symbol of a given layer were mapped to two sub-carriers and the bits from all of the layers are collectively mapped to all four sub-carriers of the transmission resource. This simulation conditions for the second technique were also applied for the downlink direction and consisted of a signal configuration of six layers having two bits per symbol per layer, which are mapped to a set of four sub-carriers. The third technique is a second embodiment of the application of the type described with reference to FIGS. 5A and 5B in which different bits of the 2-bit symbol of a layer were mapped to different respective sub-carriers so that each bit of the layer is mapped to only one sub-carrier. The simulation conditions for the third technique were applied for the uplink direction and consisted of a signal configuration of six UEs, each transmitting a single layer having two bits per symbol. Each UE maps different bits of the 2-bit symbol to different sub-carriers of a subset of two sub-carriers allocated to the UE from a total of four sub-carriers in a transmission resource. The fourth technique is a third embodiment of the application of the type described with reference to FIG. 4. The simulation conditions for the fourth technique were applied for the downlink direction and consisted of a signal configuration of six layers having two bits per symbol per layer. Different bits of the 2-bit symbol are mapped to different respective sub-carriers of a set of four sub-carriers in a transmission resource.

The following parameters were employed in the simulation:

Additive White Gaussian Noise (AWGN) Channel;

Quadrature Phase Shift Keying (QPSK) modulation;

Turbo Code, Rate=1/2;

Frame Length=576;

Number of UEs=6;

Number of samples (tones, symbols)=4,

Overload=150%.

Figure 6A:
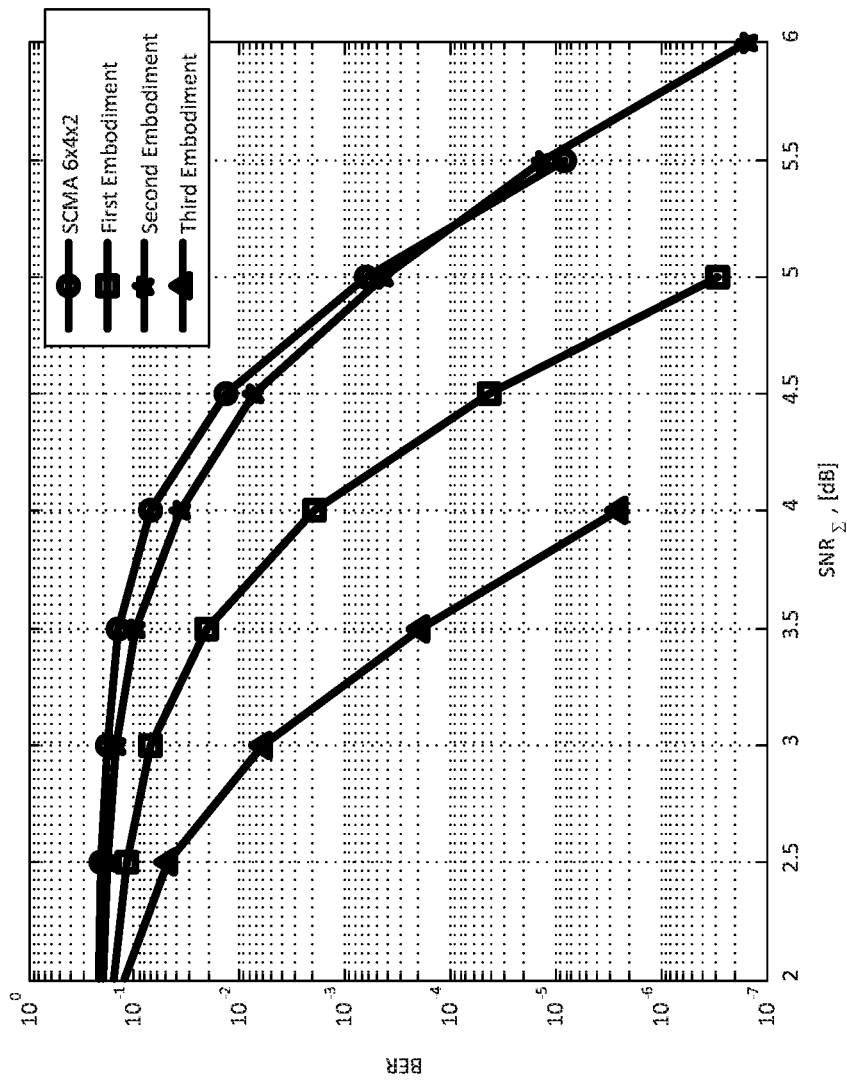
FIG. 6A is a plot of data comparing performance of Bit Error Rate (BER) for various multiple access techniques according to aspects of the disclosure.
Figure 6B:
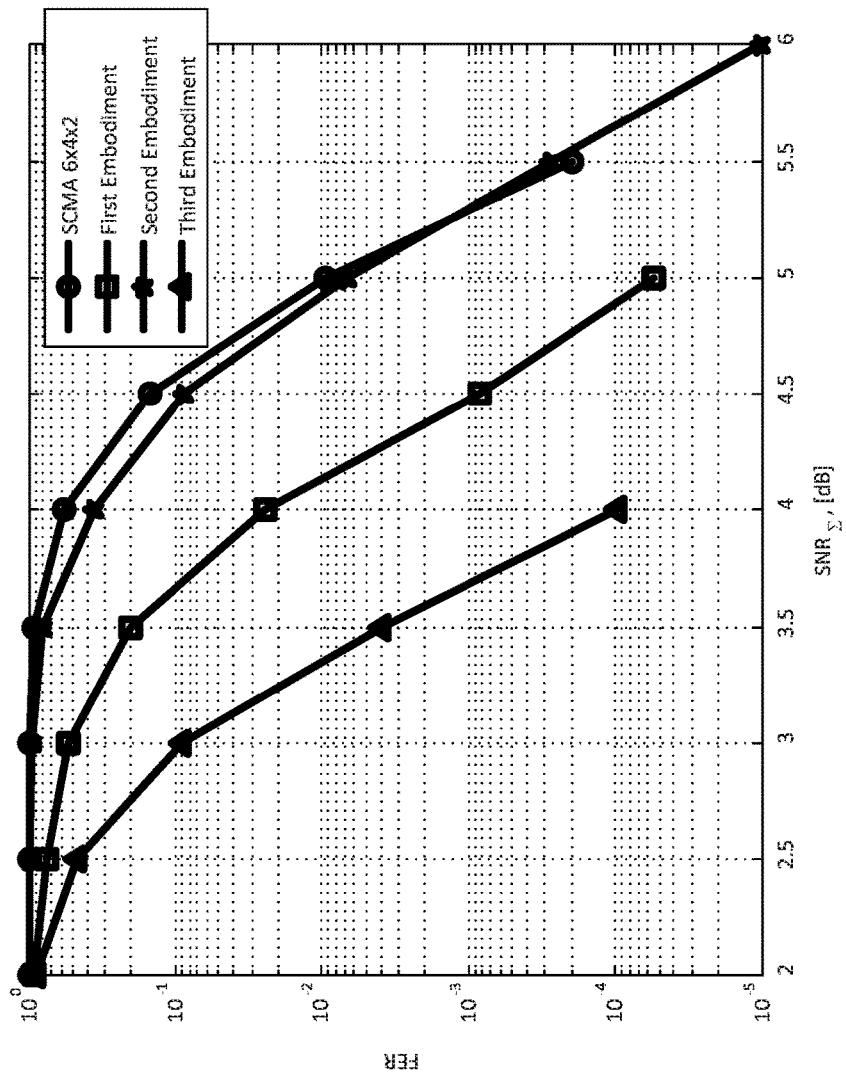
FIG. 6B is a plot of data comparing performance of Frame Error Rate (FER) for various multiple access techniques according to aspects of the disclosure.

The simulation results are shown FIGS. 6A and 6B. FIG. 6A illustrates the simulated Bit Error Rate (BER) plotted on the y-axis against the Signal-to-Noise Ratio (in dB) for each of the four techniques. Fig.6B illustrates the simulated Frame Error Rate (FER) plotted in the y-axis against the Signal-to-Noise Ratio (in dB) for each of the four techniques.

The table below summarizes for each of the techniques in the simulation the directionality of the link that the technique is used for, the gain in dB (with respect to conventional SCMA) and the approximate complexity involve in the respective technique.

|  | SCMA | First Embodiment | Second Embodiment | Third Embodiment |
| --- | --- | --- | --- | --- |
| Link | Downlink/ Uplink | Downlink | Downlink/ Uplink | Downlink |
| Gain over SCMA (FER = 1%), dB | 0 | 0.85 | 0.1 | 1.7 |
| Complexity | $\sim NN_{it}2^{kp}$ | $\sim NN_{it}2^{kp}$ | $\sim N2^{kp/q}$ | $\sim NN_{it}2^{kp/q}$ | where:
N is a number of sub-carriers;
$N_{it}$ is a number of iterations that need to be performed at decoder;
k is a number of bits per symbol per layer;
p is a number of layers mapped per sub-carrier; and
q is a number of non-zero sub-carriers that are allocated for use by each layer, out of a total number of sub-carriers in a transmission resource.

Figure 7:
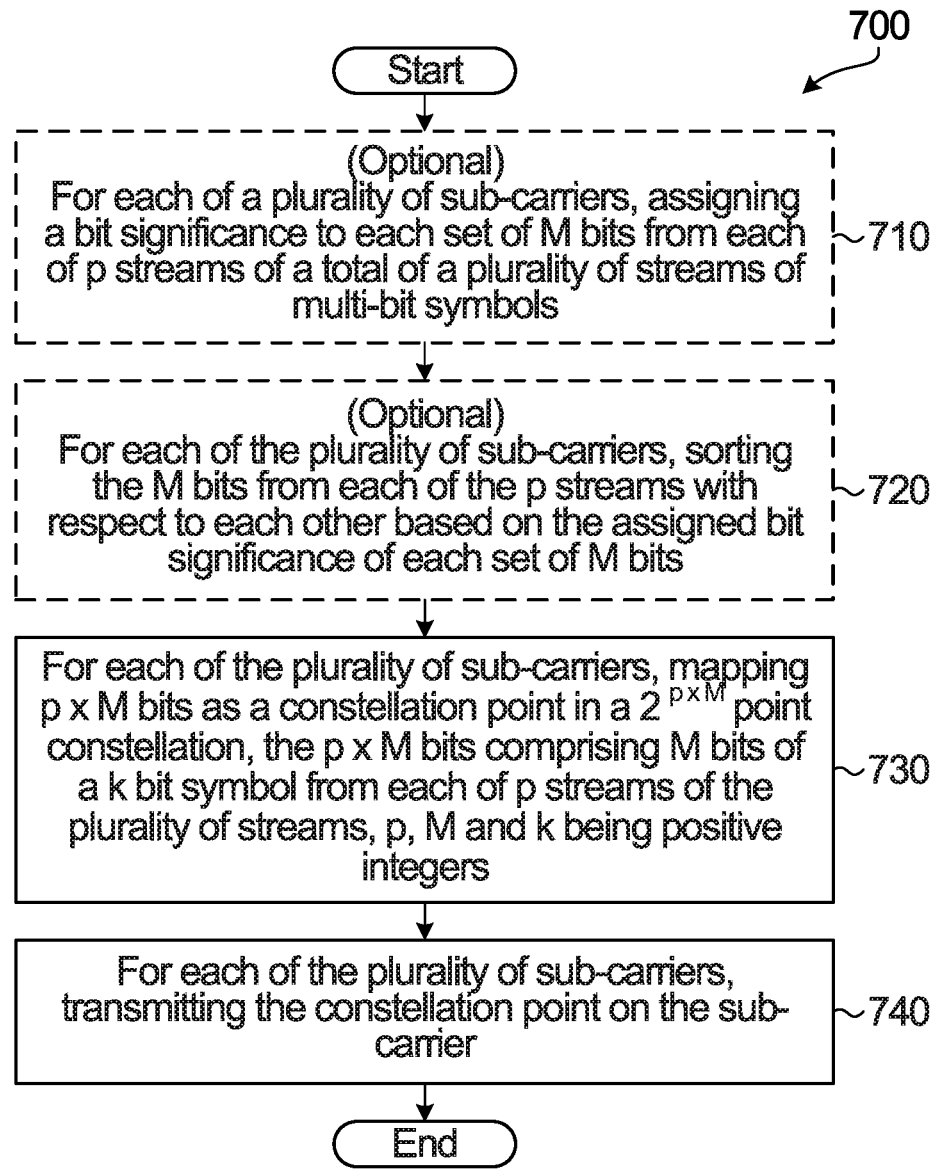
FIG. 7 is a flow chart describing a method for multiple access transmission for use in a downlink direction according to an aspect of the disclosure.

FIG. 7 is a flowchart illustrating an example of a method 700 that may be performed by a device on a network side of a communication system to transmit a multi-bit symbol from each of a plurality of streams on a set of sub-carriers. In some implementations, the device may be a base station, or collocated with a base station.

The following steps are performed for each of a plurality of sub-carriers that are allotted for transmission by the network side device. In a first optional step 710, the network side device assigns bit significances to each set of M bits from each of p streams of a plurality of streams of multi-bit symbols. In a subsequent optional step 720, the network side device sorts the M bits from each of the p streams with respect to each other based on the assigned significances of each set of M bits. In step 730, the network device maps p×M bits as a constellation point in a $2^{p \times M}$-point constellation. The p×M bits include M bits of a k-bit symbol from each of p streams of the plurality of streams, p, M and k being positive integers. At step 740, the device transmits the constellation point on the sub-carrier.

In some implementations of method 700, the number of bits M equals the number of bits k in the symbol. In this case, all of the bits of the multi-bit symbol are mapped to more than one sub-carrier of the plurality of sub-carriers. An example of such an implementation corresponds to FIG. 3.

In some implementations of method 700, the number of bits M equals the number of bits k in the symbol divided by a number of non-zero sub-carriers q allocated per stream, and each subset of set of k/q bits of the k-bit symbol is mapped to a different sub-carrier. An example of such an implementation corresponds to FIG. 5.

In some implementations when optional step 710 is performed, the significances are assigned to each set of M bits so that the M bits are not assigned a lowest significance in more than one constellation point mapping.

Figure 8:
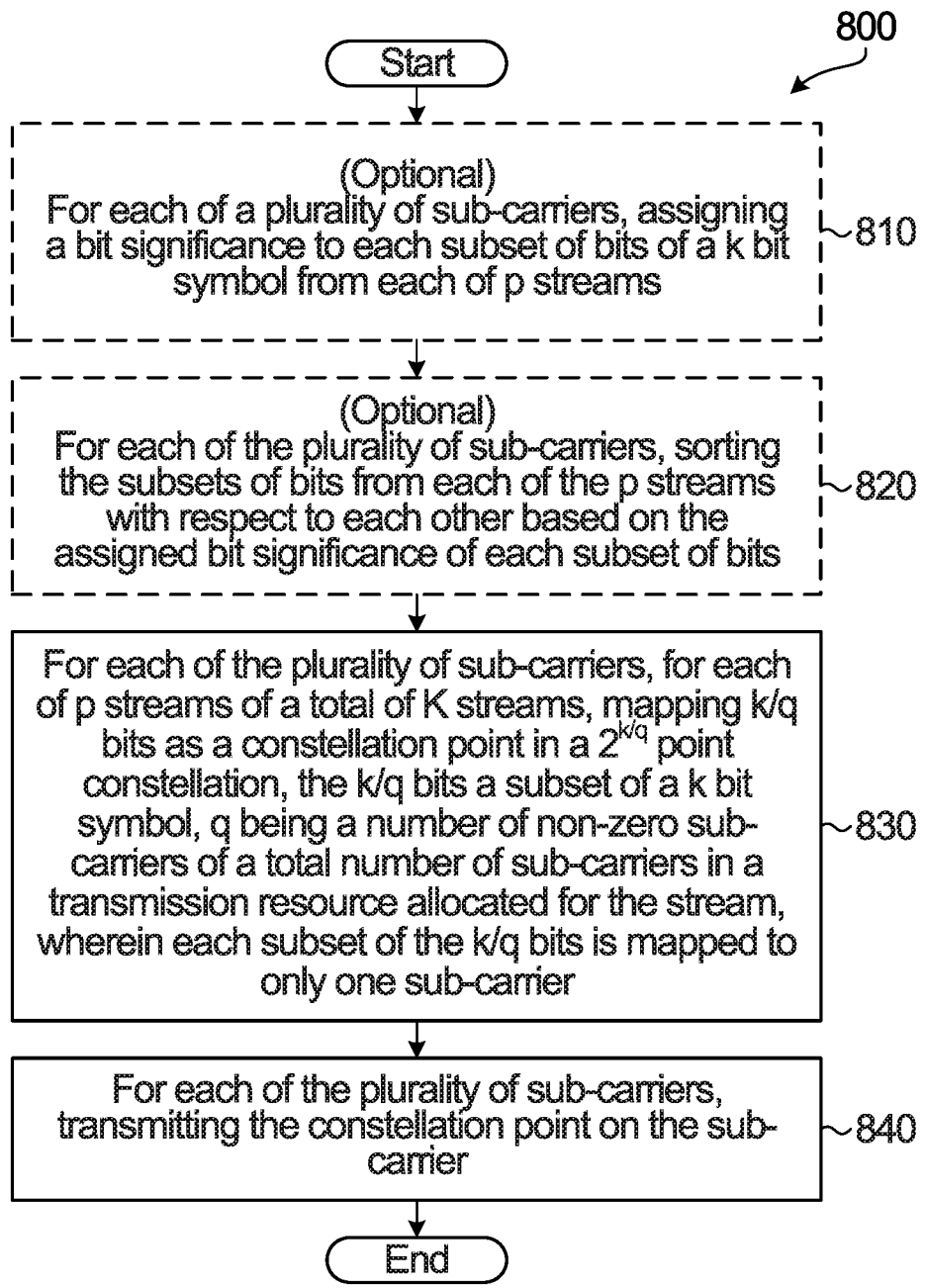
FIG. 8 is a flow chart describing a method for multiple access transmission for use in an uplink direction or a downlink direction according to an aspect of the disclosure.

FIG. 8 is a flowchart illustrating an example of a method 800 that may be performed in the downlink direction or the uplink direction. In the downlink direction, a network side device transmits a multi-bit symbol from at least one of a plurality of streams on a plurality of sub-carriers. In the uplink direction, a client side device in a communication system transmits a multi-bit symbol from at least one of a plurality of streams on a plurality of sub-carriers.

The following steps are performed for each of a plurality of sub-carriers that are allotted for transmission. In a first optional step 810, the client side device assigns bit significances to each subset of bits of a k-bit symbol from each of p streams. In a subsequent optional step 820, the client side device sorts the subset of bits from each of the p streams with respect to each other based on the assigned significance for each subset of bits. In step 830, for each of p streams of a total of K streams, the client side device maps k/q bits as a constellation point in a 2 k/q-point constellation, where q is the number of non-zero subcarriers of a total number of sub-carriers in a transmission resource that are allocated for the stream, wherein each subset of the k/q bits is mapped to only one subcarrier. The variables p and k are positive integers. At step 840, the client side device transmits the constellation point on the sub-carrier.

In a situation in which a client side device is transmitting a single stream, the value of p is equal to 1. An example of this is shown in each of the four UEs of FIG. 5.

Figure 9:
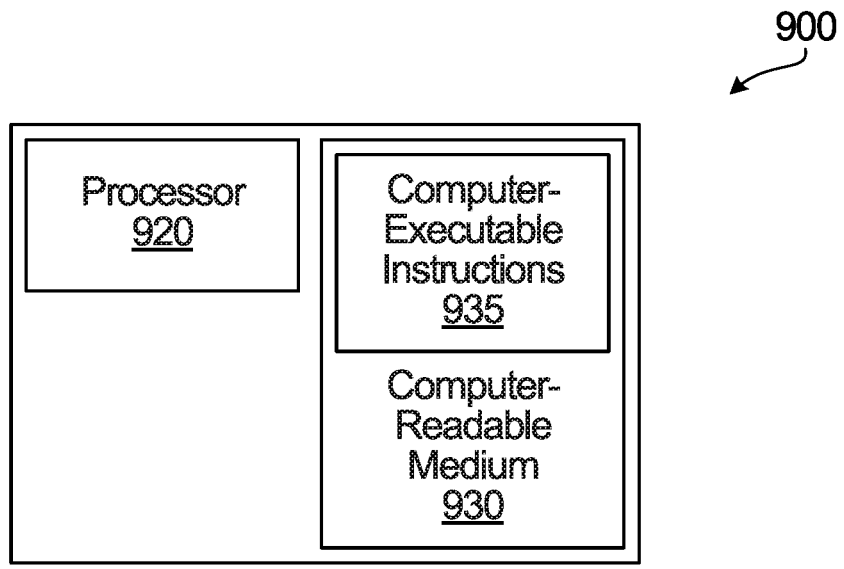
FIG. 9 is a block diagram of an apparatus for use in multiple access transmission in a downlink direction according to an aspect of the disclosure.

FIG. 9 is an example of an apparatus 900 on a network side of a communication system configured to implement aspects of the disclosure. The apparatus 900 includes a processor 920 and a computer-readable medium 930. The computer-readable medium 930 includes computer executable instructions 935 that when executed by the processor 920, are configured to transmit a multi-bit symbol from each of a plurality of streams on a set of sub-carriers. The computer executable instructions 935, when executed by the processor 920, are configured to, for each of the plurality of sub-carriers, map p×M bits as a constellation point in a $2^{p \times M}$-point constellation. The p×M bits include M bits of the k-bit symbol from each of p streams of the plurality of streams. The variables p, M and k are positive integers. The computer executable instructions 935 when executed by the processor 920, are also configured to, for each of the plurality of sub-carriers, transmit the constellation point on the sub-carrier. The computer-readable medium 930 may also include computer executable instructions 935 for implementing other functionality, such as, but not limited to, assigning bit significances to each set of M bits from each of p streams of a plurality of streams of multi-bit symbols and sorting the M bits from each of the p streams with respect to each other based on the assigned significances of each set of M bits.

The apparatus 900 may be part of a base station or collocated with a base station, and provide the base station with an encoded signal for transmission over a set of sub-carriers.

Figure 10:
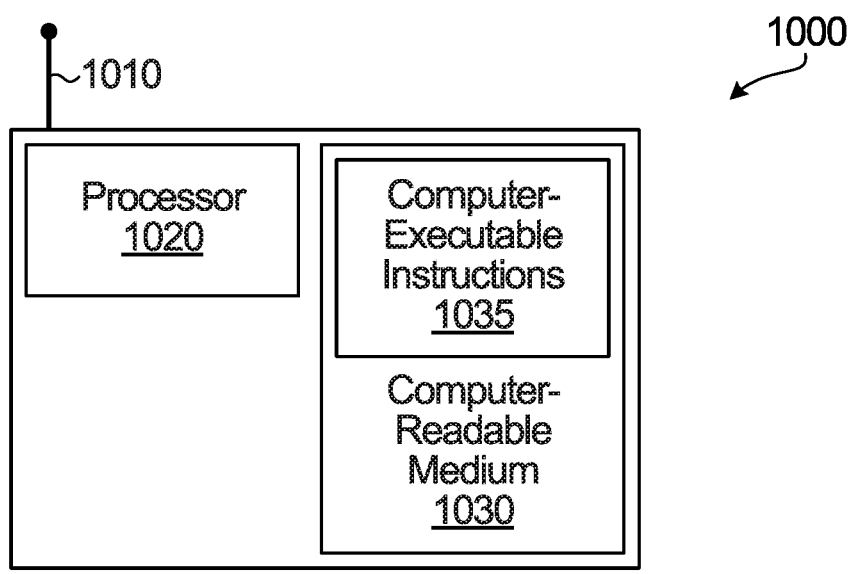
FIG. 10 is a block diagram of an apparatus for use in multiple access transmission in an uplink direction or a downlink direction according to an aspect of the disclosure.

FIG. 10 is an example of an apparatus 1000 on a client side of a communication system configured to implement aspects of the disclosure. The apparatus could be part of a UE that is one of many UEs in communication with a network side device. As described above with reference to the example of FIG. 5, multiple UEs could each be transmitting on a subset of a set of sub-carriers to the network side device.

The apparatus 1000 includes a processor 1020 and a computer-readable medium 1030. The computer-readable medium 1030 includes computer executable instructions 1035 that when executed by the processor 1020, are configured to transmit a multi-bit symbol from each of at least one stream on a plurality of sub-carriers. The computer executable instructions 1035 when executed by the processor 1020, are configured to, for each of the plurality of sub-carriers, for each of p streams of the total of K streams, map k/q bits as a constellation point in a $2^{k/q}$-point constellation, where q is the number of non-zero subcarriers of a total number of sub-carriers in a transmission resource that are allocated for the stream, wherein each subset of the k/q bits is mapped to only one subcarrier. The k/q bits include k/q bits of the k-bit symbol from each of p streams of the at least one stream, p and k being positive integers. The computer executable instructions 1035 when executed by the processor 1020, are also configured to, for each of the plurality of sub-carriers, transmit the constellation point on the sub-carrier. The computer-readable medium 1030 may also include computer executable instructions 1035 for implementing other functionality, such as, but not limited to, assigning a bit significance to each bit of a symbol from each of p streams of the at least one stream of multi-bit symbols and sorting the bits from each of the p streams with respect to each other based on the assigned significances for each set of k bits.

Numerous modifications and variations of the present disclosure are possible in light of the above teachings. It is therefore to be understood that within the scope of the appended claims, the disclosure may be practiced otherwise than as specifically described herein.

What is claimed is:

1. A method of signal transmission for a plurality of streams of multi-bit symbols comprising:
   mapping first p×M bits as a first constellation point in a $2^{p \times M}$-point constellation, the first p×M bits comprising first M bits of a k-bit symbol from each of first p streams of the plurality of streams, p, k and M being positive integers, and p being greater than 1;
   mapping second p×M bits as a second constellation point in the $2^{p \times M}$-point constellation, the second p×M bits comprising second M bits of the k-bit symbol from each of second p streams of the plurality of streams, the first p streams and the second p streams having at least one stream in common;
   transmitting the first constellation point on a first sub-carrier; and
   transmitting the second constellation point on a second sub-carrier.

2. The method of claim 1, further comprising a network side component transmitting the plurality of streams of multi-bit symbols on N sub-carriers in a downlink direction, N being a positive integer.

3. The method of claim 1, wherein M equals k so that all bits of the k-bit symbol are mapped to more than one sub-carrier.

4. The method of claim 1, wherein M equals a number of bits in the k-bit symbol (k) divided by a number of nonzero sub-carriers (q) allocated per stream (k/q) and each set of k/q bits of the k-bit symbol is mapped to a different sub-carrier.

5. The method of claim 1, wherein mapping the first and second p×M bits each further comprises sorting the respective first or second M bits from each of the respective first or second p streams with respect to each other based on a set of assigned bit significances for each of the respective first or second M bits.

6. The method of claim 5 further comprising, for each of the first and second sub-carriers:
   assigning a bit significance to each of the respective first or second M bits from the respective first or second p streams.

7. The method of claim 6, wherein assigning the bit significance to each of the respective first or second M bits comprises assigning the bit significance to each of the respective first or second M bits so that the first and second M bits are not assigned a lowest significance in more than one constellation point mapping.

8. An apparatus comprising:
   a processor; and
   a non-transitory computer-readable medium having stored thereon computer executable instructions, that when executed by the processor, perform a method for transmitting a plurality of streams of multi-bit symbols, the method comprising:
   mapping first p×M bits as a first constellation point in a $2^{P \times M}$-point constellation, the first p×M bits comprising first M bits of a k-bit symbol from each of first p streams of the plurality of streams, wherein p, M and k are positive integers, and wherein p is greater than 1;
   mapping second p×M bits as a second constellation point in a $2^{P \times M}$-point constellation, the second p×M bits comprising second M bits of the k-bit symbol from each of second p streams of the plurality of streams, wherein the first p streams and the second p streams have at least one stream in common;
   transmitting the first constellation point on a first sub-carrier; and
   transmitting the second constellation point on a second sub-carrier.

9. The apparatus of claim 8, wherein the apparatus is a network side component transmitting the plurality of streams of multi-bit symbols on N sub-carriers in a downlink direction, N being a positive integer.

10. The apparatus of claim 8, wherein M equals k.

11. The apparatus of claim 8, wherein M equals a number of bits in the k-bit symbol (k) divided by a number of nonzero sub-carriers (q) allocated per stream (k/q) bits and each set of k/q bits of the k-bit symbol is mapped to a different sub-carrier.

12. The apparatus of claim 8, wherein the computer executable instructions, when executed by the processor, further perform:
   assigning a bit significance to each of the respective first or second k bits from each of the respective first or second p streams.

13. The apparatus of claim 12, wherein the computer executable instructions, when executed by the processor, further perform:
   sorting the respective first or second M bits from each of the respective first or second p streams with respect to each other based on the assigned bit significances of the each of the respective first or second k bits.

14. A method of signal transmission for at least two streams of multi-bit symbols comprising:
   for first p streams of a total of K streams, mapping first k/q bits from each of the first p streams as a first constellation point in a $2^{k/q}$-point constellation, the first k/q bits being a first subset of a k-bit symbol, q being a number of non-zero sub-carriers of a total number of sub-carriers in a transmission resource allocated for each of the first p streams, p, K, k and q being positive integers, and p being greater than 1;
   for second p streams of the total of K streams, mapping second k/q bits from each of the second p streams as a second constellation point in the $2^{k/q}$-point constellation, the second k/q bits being a second subset of the k-bit symbol, the first p streams and the second p streams having at least one stream in common;
   transmitting the first constellation point on a first sub-carrier; and
   transmitting the second constellation point on a second sub-carrier.

15. The method of claim 14, wherein transmitting the constellation points comprises a User Equipment (UE) transmitting the at least two streams of multi-bit symbols on q sub-carriers in an uplink direction.

16. The method of claim 15, wherein the q sub-carriers are a subset of N sub-carriers allocated as a transmission resource for transmission by a plurality of UEs, which includes the UE, in the uplink direction.

17. The method of claim 14, wherein transmitting the constellation points comprises a network side device transmitting the at least two streams of multi-bit symbols on N sub-carriers in a downlink direction.

18. The method of claim 14, wherein mapping the respective first and second k/q bits further comprises sorting individual bits from each of the respective first or second p streams with respect to each other based on an assigned set of bit significances for each set of bits.

19. The method of claim 18 further comprising, for each of the first and second sub-carriers:
assigning a bit significance to each of the respective first or second k/q bits of the k-bit symbol from the respective first or second p streams.

20. The method of claim 19, wherein assigning the bit significance to each of the respective first or second k/q bits of the k-bit symbol comprises assigning the bit significance to each of the respective first or second k/q bits so that all bits from the k-bit symbol are not assigned a lowest significance in more than one constellation point mapping.

21. An apparatus comprising:
a processor; and
a non-transitory computer-readable medium having stored thereon computer executable instructions, that when executed by the processor, perform a method for transmitting a multi-bit symbol from each of at least one stream on a plurality of sub-carriers, the method comprising:
for first p streams of a total of K streams, mapping first k/q bits from each of the first p streams as a first constellation point in a $2^{k/q}$-point constellation, the first k/q bits being a first subset of a k-bit symbol, q being a number of non-zero sub-carriers of a total number of sub-carriers in a transmission resource allocated for each of the first p streams, wherein p, K, k and q are positive integers, and wherein p is greater than 1;
for second p streams of a total of K streams, mapping second k/q bits from each of the second p streams as a second constellation point in the $2^{k/q}$-point constellation, the second k/q bits being a second subset of the k-bit symbol, the first p streams and the second p streams having at least one stream in common;
transmitting the first constellation point on a first sub-carrier; and
transmitting the second constellation point on a second sub-carrier.

22. The apparatus of claim 21, wherein p=3 as the apparatus is transmitting data of three streams.

23. The apparatus of claim 21, wherein the computer executable instructions, when executed by the processor, further perform:
assigning a bit significance to each of the respective first or second k/q bits of the k-bit symbol from the respective first or second p streams.

24. The apparatus of claim 23, wherein the computer executable instructions, when executed by the processor, further perform:
sorting the respective first or second k/q bits from each of the first or second p streams with respect to each other based on the assigned bit significances for the each of the respective first or second k bits.

* * * * *